Nov. 14, 1939. C. E. RORRER ET AL Re. 21,264

SHOWCASE

Original Filed Dec. 8, 1933

INVENTORS.
C. E. Rorrer and A. R. Mitterer.
BY
G. J. Rollandet
ATTORNEY.

Reissued Nov. 14, 1939 Re. 21,264

UNITED STATES PATENT OFFICE 21,264

SHOWCASE

Charles E. Rorrer and Albert R. Mitterer, Denver, Colo., assignors to Stadium Stores, Inc., Denver, Colo.

Original No. 2,083,093, dated June 8, 1937, Serial No. 701,494, December 8, 1933. Application for reissue March 28, 1938, Serial No. 198,359½

11 Claims. (Cl. 62—89.6)

This invention relates to new and useful improvements in refrigerating show cases in which an enclosed compartment for perishable merchandise has a slanting top for the display of vegetables and other less perishable products, and adjacent the same a cooling element having a refrigerant effect upon said products.

The slanting top displays the vegetables and other articles in such a manner that those at the rear of the case appear as prominently as those nearer the front of the same and so that a quantity of substantially even thickness will give the impression of a volume of greater depth. Therefore, the slanting display top is an important feature of the showcase, since one of its outstanding objects is to provide a case which displays merchandise in such an alluring fashion that prospective purchasers are unconsciously attracted, with the obvious result of increased sales.

It is an object of the present invention to still further enhance the attractive display of merchandise upon the top of the showcase by the ingenious use of a mirror which by reflection of the merchandise in the line of view of a person facing the case at a distance therefrom creates the impression of a larger quantity of merchandise than actually is disposed upon the case. Another equally important result of the use of the mirror is that all of the displayed merchandise may be seen in its most attractive aspect by all persons, irrespective of their varying statures, it being obvious that tall persons have under ordinary conditions a far better view of the merchandise than persons of lesser height.

A further object of the invention resides in an improved construction of the cooling element adjacent the top of the showcase, whose function is to maintain the displayed merchandise in fresh condition notwithstanding the fact that it is continuously exposed to the atmosphere.

Figure 2:
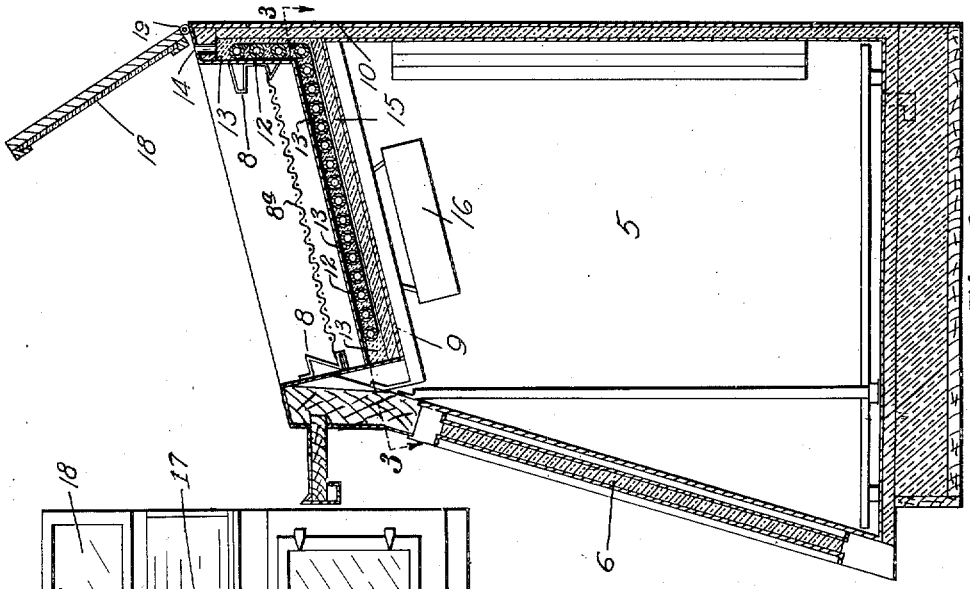
Figure 1:
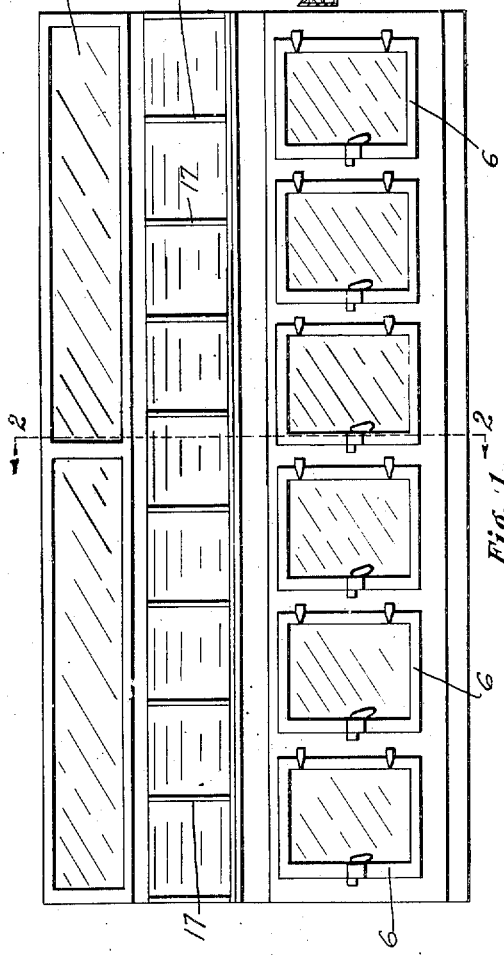
Figure 3:
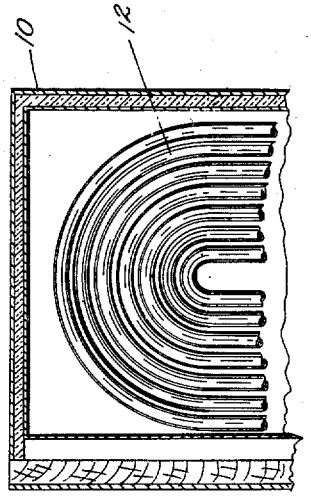

An embodiment of the invention has been illustrated in the accompanying drawing, in the several views of which like parts are similarly designated and in which Figure 1 is a front view of the improved showcase, Figure 2 an enlarged vertical section taken on the line 2—2 of Figure 1, and Figure 3 a fragmentary section in the plane indicated by the line 3—3 of Figure 2.

The showcase as shown has an insulated compartment 5, normally closed, for the storage of perishable merchandise. Glass doors 6 at the slanting front of the compartment afford access to its interior. The slanting top of the compartment is enclosed on four sides to provide a bin which is open to the atmosphere. Brackets 8 at opposite sides of the bin support perforated shelves 8a for the support of merchandise in layers. The shelves, however, are not an essential of the construction and may be removed when not in use.

The bottom 9 and the rear wall 10 of the bin are double to provide spaces for the refrigerating element hereinbefore referred to. This element consists of series of tubes 12 for the circulation of a refrigerant, which are embedded in a body 13 of "Hydroline" or the like, which in a liquid condition is poured into the space through an opening 14 at the top thereof and hardens in place. "Hydroline" is a tar-like composition possessing heat insulating properties. The tubes contact with the metal inner members of the double walls of the bin, thereby cooling the merchandise within the bin. A slab 15 of cork or other material of similar characteristic is placed in the lower portion of the bottom wall of the bin to insulate it from the compartment 5.

A refrigerating coil, indicated at 16, is suspended within the compartment 5 for cooling purposes. Partitions, shown at 17 in Figure 1 of the drawing, divide the open bin into several compartments for the separation of different kinds of vegetables contained in the bin.

The mirror 18 hereinbefore referred to projects upwardly from the rear wall of the bin in a forwardly slanting position. The slant of the mirror is such that it reflects all of the merchandise contained in the bin, so that it may be seen by any person irrespective of his or her stature and at any distance from the front of the showcase. It will be understood that the mirror must extend along the entire length of the case, in order to produce the desired effect, and that if necessary, it may be made in sections, as shown in Figure 1.

The mirror creates the impression of double the quantity of merchandise than is actually contained in the bin; and owing to its brilliance, it displays the merchandise in the most alluring manner. As stated hereinbefore, the mirror has the additional object of displaying all the merchandise contained in the bin to all persons, irrespective of their statures, and it is preferably connected with the rear wall of the bin by a hinge 19 in order that it may be adjusted to different angles with relation to the sloping top of the showcase, in accordance with varying conditions and requirements.

Having thus described our invention, what we claim and desire to secure by Letters Patent is:

1. A showcase comprising an open top bin having a bottom inclined upwardly from the front of the showcase, an upright conductive wall at the rear, upper edge of said bottom, a refrigerating element behind said wall and extending a substantial distance above the upper edge of the bottom, a foraminous support spaced from the bottom of the bin, a front wall of the bin extending generally upwardly from the bottom of the bin to a point at least as high as the front edge of the support, and side walls for the bin, the rear, front and side walls being arranged to form a cold air space between the bottom of the bin and the formainous support, said air space being unobstructed and the inclined bottom causing air cooled by the refrigerating element at the rear of the bin to move downward in said unobstructed space and along the bottom toward the front wall, to cool merchandise on said support.

2. The method of refrigerating merchandise exposed to the atmosphere, comprising confining an inclined space on four sides and at the bottom, confining merchandise thereabove to provide an upper limit for an air chamber in said space, refrigerating air, introducing refrigerated air at the upper portion of said chamber, which air flows down the inclined bottom of the chamber, and passing the refrigerated air up into the merchandise defining the upper limit for the chamber, to cool the merchandise thereabove.

3. The method of refrigerating merchandise exposed to the atmosphere, comprising providing an inclined space by confining four sides and providing an inclined bottom therefor, confining merchandise at a similar incline at a short distance above the bottom, to provide an upper limit for an air chamber in said space, introducing refrigerated air at the upper portion of the inclined chamber, directing the cooled air to flow downward by gravity from the upper portion to the lower portion of said inclined chamber, and passing the refrigerated air up into the merchandise defining the upper limit for the chamber, to cool the merchandise thereabove.

4. A showcase comprising an open top bin having a bottom inclined upwardly from the front of the showcase, a refrigerating element arranged at the upper edge of the inclined bottom, a foraminous support spaced from the bottom of the bin, a front wall for the bin extending generally upwardly from the bottom of the bin higher than the front edge of the support, and side walls for the bin, the front and side walls being arranged to form a cold air space between the bottom of the bin and said support, said air space being unobstructed and the inclined bottom causing air cooled by the refrigerating element to move downward in said unobstructed space and along the bottom toward the front wall and up through the foraminous support, to cool merchandise on said support.

5. A showcase having at its top an open bin with a double rear wall and a double bottom, providing spaces for a cooling element, tubes for a refrigerant in said spaces, a body of "Hydroline" or the like, in which the tubes are embedded, and insulating means for confining the refrigeration within the open top.

6. A showcase having at its top an open bin with a double rear wall and a double bottom providing spaces for a cooling element, a layer of cork or the like in the space of the bottom, tubes for a refrigerant in the spaces, that in the space of the bottom being above said layer, and a body of "Hydroline" or the like in which the tubes are embedded.

7. A showcase having an open bin with a support for merchandise slanting forwardly and downwardly, for the display of the merchandise in a correspondingly slanting position, said bin having a retaining wall projecting upwardly from the lower portion of the bin; refrigerating means extending from the lower portion of the bin to and a substantial distance above the highest portion of the bottom thereof, and a mirror carried at the back of the bin, said mirror being positioned to slant over the bin from a point adjacent the rearward edge thereof, whereby cooled air may travel from the rear to the front of said bin over goods arranged therein, and such merchandise may be reflected toward the front of the showcase.

8. A showcase as defined in claim 7, in which means are provided for spacing the merchandise in the bin from the refrigerating means whereby to facilitate circulation of air in contact with said merchandise.

9. A showcase having an open bin with a support for merchandise slanting forwardly and downwardly, for the display of the merchandise in a correspondingly slanting position, said bin having a retaining wall projecting upwardly from the lower portion of the bin; refrigerating means arranged to cooperate with said support, to cause a flow of cooled air across said merchandise, and a mirror carried at the back of the bin, said mirror being positioned to slant over the bin from a point adjacent the rearward edge thereof, whereby such merchandise may be reflected toward the front of the showcase.

10. A showcase comprising an open top bin having a bottom inclined upwardly from the front of the showcase, an upright, conductive wall at the rear, upper edge of said bottom, a foraminous support spaced from the bottom of the bin, a front wall for the bin extending generally upwardly from the bottom of the bin to a point higher than the front edge of the support, and side walls for the bin, the rear, front and side walls being arranged to form a cold air space between the bottom of the bin and said support, a refrigerating element arranged out of said cold air space but in heat-transferring relation to said rear wall, to provide a clear space between the bottom and the support, the inclined bottom causing air cooled by the rear wall to move downward along the bottom in said clear space and toward the front wall, to cool merchandise on said support.

11. The method of refrigerating merchandise upon a support exposed to the atmosphere, comprising confining an inclined space on four sides and at a bottom below the support, confining a space above the support at least at the forward edge of the support, refrigerating air at the upper portion of the inclined space below the support, whereby the air flows down the inclined bottom of the chamber, passing the refrigerated air through the support, and collecting a pool of cooled air above the support at least at the forward edge of the support, to cool merchandise thereon.

CHARLES E. RORRER.
ALBERT R. MITTERER.